United States Patent
Deschler

(10) Patent No.: US 7,004,636 B2
(45) Date of Patent: Feb. 28, 2006

(54) MACHINE HOUSING

(75) Inventor: Arnulf Deschler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 353 days.

(21) Appl. No.: 10/381,110

(22) PCT Filed: Sep. 20, 2001

(86) PCT No.: PCT/EP01/10868

§ 371 (c)(1),
(2), (4) Date: Mar. 20, 2003

(87) PCT Pub. No.: WO02/25124

PCT Pub. Date: Mar. 28, 2002

(65) Prior Publication Data

US 2004/0022466 A1 Feb. 5, 2004

(30) Foreign Application Priority Data

Sep. 23, 2000 (DE) .......................... 100 47 233

(51) Int. Cl.
F16C 27/00 (2006.01)
F16C 27/04 (2006.01)

(52) U.S. Cl. ........................ 384/535; 384/536; 384/581; 384/582; 384/456; 384/490; D15/143

(58) Field of Classification Search ................. 384/456, 384/490, 535, 536, 537, 548, 581, 582, 584, 384/585, 542; 418/83; D15/143
See application file for complete search history.

(56) References Cited

U.S. PATENT DOCUMENTS

| | | | |
|---|---|---|---|
| 2,277,635 A | * | 3/1942 | Delaval-Crow ............. 384/542 |
| 3,280,802 A | * | 10/1966 | Froede ........................ 418/83 |
| 3,550,474 A | | 12/1970 | Maurice et al. ............... 74/606 |
| 3,942,502 A | | 3/1976 | Gorres et al. ............ 123/195 R |
| 4,377,093 A | | 3/1983 | Janson ......................... 74/477 |

(Continued)

FOREIGN PATENT DOCUMENTS

| | | |
|---|---|---|
| DE | 1 812 232 | 12/1969 |
| DE | 195 48 829 | 1/1997 |
| DE | 196 04 886 | 8/1997 |
| DE | 197 32 422 | 2/1998 |
| DE | 198 25 442 A1 | 10/1999 |
| EP | 0029263 A1 * | 5/1981 |
| GB | 2 345 041 A | 6/2000 |
| JP | 6-33938 * | 2/1994 |
| JP | 6-58336 * | 3/1994 |

Primary Examiner—David A. Pucci
Assistant Examiner—Colby Hansen
(74) Attorney, Agent, or Firm—Davis & Bujold, P.L.L.C.

(57) ABSTRACT

The concept of the invention is based on a machine housing with a bearing housing, the bearing seat of which is connected to a housing wall of the machine housing by a bearing housing wall provided with ribs (42, 43) and is subjected to radially directed forces (11, 44). The proposal is made that the bearing housing wall possess at least one ring shaped annular rib (42) which at least partially encompasses the bearing seat in an area (21), the angle (α) of inclination of which, relative to its original unloaded condition, would change itself to the greatest extent under load (11). Further proposed is that a plurality of additional ribs (43) run transverse to the annular rib (42). Thereby, with a relatively small consumption of material, a good shape-retention is achieved. In addition, a tilting of the bearing seat and the bearing is held to a lesser extent than is the case of conventional bearing housing structures. By the use of shell shaped bearing housings, the bearing housing wall is characterized by a more intensive curvature in the more heavily stressed area (21) than is the case in the area (22) which lies diametrically (with respect to the bearing axis) opposite.

8 Claims, 5 Drawing Sheets

U.S. PATENT DOCUMENTS

| | | | | |
|---|---|---|---|---|
| 4,396,236 A | * | 8/1983 | Asberg | 384/537 |
| 4,460,285 A | * | 7/1984 | O'Donnell | 384/152 |
| 4,710,037 A | * | 12/1987 | Newberg | 384/537 |
| 4,823,637 A | * | 4/1989 | Taguchi et al. | 74/606 R |
| 5,328,274 A | * | 7/1994 | Wallace et al. | 384/428 |
| 5,423,614 A | * | 6/1995 | Wunner et al. | 384/428 |
| 5,938,169 A | | 8/1999 | Ogawa et al. | 248/674 |
| D418,847 S | * | 1/2000 | Ichihara | D15/143 |
| 6,045,268 A | * | 4/2000 | Long et al. | 384/542 |
| 6,122,995 A | | 9/2000 | Gievers et al. | 74/606 R |
| D442,197 S | * | 5/2001 | Willet | D15/143 |
| 6,322,254 B1 | * | 11/2001 | Schwinghammer et al. | 384/537 |
| 6,412,985 B1 | * | 7/2002 | Schweitzer et al. | 384/585 |
| 6,481,989 B1 | * | 11/2002 | Eiermann | 418/61.2 |
| 6,700,255 B1 | * | 3/2004 | Stenta | 310/90 |

* cited by examiner

MACHINE HOUSING

FIELD OF THE INVENTION

The invention concerns a machine housing.

BACKGROUND OF THE INVENTION

The majority of machine housings possess housing parts which are designed as bearing housings for rotating or sliding bearings. The bearing housing can be an integral component of the machine housing or it may be a separate entity, for example, a bearing cover affixed to the machine housing. The bearing housing, as a rule, possesses at least one bearing seat which is connected to the housing wall of the machine by means of a bearing housing wall. Under the stress of axial and radial forces, such a bearing housing wall is deformed and has a tendency to extend itself, more or less, overstepping its original positioning. In its unstressed original condition, the said bearing housing can be, to a great extent, quite flat. From the standpoint of construction as well as strength of material, the said bearing housing frequently is made in a shell form which may be enhanced with ribs in order to improve its shape-retention and to counter vibration or to cool the bearing.

Such machine housings are installed in a multiplicity of embodiments in the industry, including transmission housings, housings for drive engines, for metal working machines and to meet requirements of various applications. For example, reference is made to the book "Zahnradgetriebe", wherein Johannes Loomann, in his design books, Volume 26, Springer-Verlag Berlin 1970, presents an axle drive, the housing of which exhibits a bearing housing for a tapered roller bearing in which the differential cage is located in the housing of the axle drive. In this case, a bearing housing is designed as a bearing cover, and covers a mounting opening for the axle drive, while the other bearing housing is an integral component of the drive housing.

The rear axle tapered drive serves a personal passenger car, wherein the differential cage is driven by a beveled pinion. The high drive moment at the said drive pinion generates a substantial radially directed bearing force, besides axial bearing forces, when motor is in a compression mode, which stresses the bevel roller bearing in a limited circumferential area. In power-input mode, the radial force is essentially less and runs about 30% of that of the compression mode. Moreover, the radial force in the power-input mode runs offset at an angle γ in the circumferential direction, in relation to the radial force of the compression mode, which angle is generally 90°. Because of the geometrical relationships of the tapered roller bearings, besides the axial forces which the bevel drive produces, the radial stresses also generate additional axial forces which act on a circumferential area wherein radial loading finds its abutment, producing, all together, an eccentrical bearing loading which results in an unsymmetrical deformation of the bearing housing wall. This is superimposed by deformations which arise because of irregular elasticities in the housing of the bearing wall and in the contiguous wall of the machine housing.

Structures pertaining to the bearing housings, which are not optimally designed in regard to their rigidity, exhibit a relatively large displacement and tipping of the bearing seat when under stress and as a result of the elastic deformation. The disadvantages which arise therefrom are multifaceted. In the building of drives and, in fact, anywhere that toothed gears are in question, such displacements of the bearing seats result in effects on the tooth contact. Deviations from the linear disposition of the tooth faces are a result of the said displacements and, in turn, lead to structural strength and to noisy operation. In order to obviate this problem, most of the toothing has a tooth-face correction. This, however, can be an optimal solution for no more than one operational condition. This said optimal condition, on the grounds of structural strength, is mostly at the maximum loading condition. Accordingly, correction is applied for that situation and correspondingly unwanted noise occurs in the preponderantly employed partially load areas. This set of problems largely comes about at the end of a drive trains in the case of bevel gear drives. At this location, high moments are in effect reacting on toothing which are sensitive in regard to their bearing support. This is the case in drives for front driven vehicles with longitudinally constructed front motors.

The same can be said for rear driven vehicles with, again, longitudinally set motors and in the case of 4-wheel drive, as well as for direct driven axles. Problems arise not only in the toothing, but also the bearing itself will fail earlier if the displacements become too great. The tilting of the inner ring and the outer ring of the bearing as well as the axial spread of the bearing seat in the case of bevel gear bearings, all lead to smaller load handling areas and therewith to higher pressures acting on the bearings.

As the loading areas become smaller, then the axial forces act with increasing eccentricity, whereby the effect of tilting is magnified and so, in turn, with increasing deformation of the bearing housing, the geometrical stress conditions become more and more unfavorable.

By means of an increased shape-retention of the bearing housing, the running wear and tilting deformation of the bearing seat can be maintained at a lower level, however, a greater stiffness of the housing leads, in general, to greater weight. This is due to the fact the most rigid state is reached when the entire available installation space is filled with supporting material. This indicates, in any case, the worst solution to the problem which, above all, is not acceptable in the vehicle world and in no way can be justified in the manufacturing design.

In the case of most of the known solutions, a larger portion of the installed material finds its place in the walls of the bearing housing. Furthermore, stiffening and reinforcing ribs are often placed in a traditional, radial disposition about the bearing axis and are circumferentially apportioned about the bearing seat. The ribs increase, in particular, the resistance moment of the bearing housing wall and, in common with the wall, are also subjected to bending.

Thus the invention has the purpose of optimizing the bearing housing of a generic machine housing in regard to the content of material and the rigidity of the same.

SUMMARY OF THE INVENTION

In accord with the invention, the bearing housing wall is to have at least one ring shaped annular rib which entirely or partially encompasses an area, which would alter its angle of inclination the most when stressed relative to its original condition ribbing, and further the said area is to possess a plurality of additional ribs running transversely to the said at least one annular ring. In the case of axial loading and a corresponding deformation of the bearing wall, the said annular rib tilts outward whereby the free segment of the annular ring displaces itself through the longest path. This acts to buildup corresponding tension in the direction of the circumference which acts counter to deformation. The course of the said tension just increases so much steeper the more the annular ring tilts beyond its original position.

On this account, it is of advantage to place the annular ring in that area of the bearing housing wall wherein the wall, without the said annular ring, would increase its angle of inclination the most under load. So that, first the angle, which encompasses the annular ring with the bearing housing wall, is held continually constant even under loading, and second so that the greatest possible elasticity can be attained, additional ribs are provided at appropriate intervals from one another which run transverse to and are integrated with the said annular rib. The annular rib, or a plurality thereof which are concentric to one another, obviously run, along their length, circumferentially to one another and/or are bound to a bearing block. This arrangement allows a satisfactory reception of the tension forces.

The said annular ribs encompass the highly stressed area of the bearing and/or bearing seat in the manner of a collar. Further the said ribs lie advantageously in an area which is diametrically opposite to the area where the maximal inclination changes of the bearing housing wall take place, and run proximal to the bearing block or are integral therewith. By means of the relatively shorter annular ribs, the material consumption is kept to a minimum, since the tension buildup is indeed positively influenced by the change in the inclination and the height of the ribs not, however, because of the length of the circumference of the annular ribs. The annular ribs act in this area very favorably for shape-retention since, because of geometric relationships, the tension stresses in the circumferential direction climb very rapidly with the deformation.

The annular ribs advantageously possess an essentially elliptic configuration. In principal, the elliptic incremental parts of the annular ribs, which are situated between the transversely running ribs, can be replaced by straight pieces whereby an even a more rigid structure is created. With a closely meshed connection by the transversely running ribs the effect is, in any case, very small.

Further, the more sharply curved ribs of the ellipse extend themselves farther radially outward than do the less curved ribs, so that the more intensively curved ribs are more greatly stressed, since the curvature of the bending line increases toward the outside. Finally, the annular ribs have the advantage that they enable the least stressed area, which lies diametrically opposite to the most stressed area, to carry more of the load. In accord with one embodiment of the invention, the bearing housing wall is subjected to a radially directed principal load and is designed in shell form wherein, in the shell area receiving the principal axial and radial loads, the shell is more acutely curved in its longitudinal cross-section than it is in that area which lies diametrically opposed, relative to the bearing axis.

With this in mind, the basic concept of the design is first that part of the bearing housing, which encompasses the loaded area, differs from that part of the bearing wall which lies diametrically opposite therefrom in relation to the bearing axis. The area of the loaded area carries the greatest apportionment of the stress. The reason for this is that the force from the shaft is introduced into the bearing wall exclusively from its contact points with the bearing and from the bearing seat. Thus, only compressive forces are exercised on the loaded area, while the diametrically opposite lying area must accept that loading which, emanating from the load area, is conducted around the bearing seat. The second reason to form the areas of the bearing housing differently is based on deformation characteristics and on the therewith connected fundamentals of technical mechanics.

By means of a more pronounced curvature of the bearing housing wall in the loaded area, the bearing seat, subjected to the combined axial and radial loading, is directed so that the bearing outer-ring inclines itself at a smaller angle. Further, the bearing housing wall is apportioned to a greater extent into one area parallel to the bearing plane and into another area which runs perpendicular thereto. While the first area is strongly stressed toward bending by the axial forces—thereby contributing to the mentioned tilting of the outer bearing rings—the second area is in its shape. On the first area and the transitional area to the second area, it is now possible to employ the inventive design features.

Reacting to the described construction, when the said shell is under stress, the bearing mid-point migrates in the direction of the load and toward the connection flange, that is, toward the flange of the bearing housing and locates itself at the same radial offset, in the case of the invented structure, but further inward than would be the case with a rotation-symmetrical structure of the bearing housing. With increasing radial loading, the force being transferred concentrates itself into a smaller load area so that, going to extremes, the loaded area shrinks to a point. In this condition, the complete axial force acts upon the load area entirely outside of the outer ring of the bearing, and thereby achieves the maximal eccentricity of its resultant line of action. In any case, the axial position of the shaft is fixed at this point. Although, in the case of a rotation-symmetric structure, the load area deviates toward the outside, in the case of the invented solution, the load area migrates inward so that this pretensioning effect works against the actual unfavorable axial displacement caused by elasticity.

In accord with the invention, on the convex side of the bearing house wall, especially in the outer area of the incremental part—which runs essentially parallel to the plane of the bearing, or in the neighboring incremental part, that is, toward which the area changes its inclination the most—at least one annular rib is placed, across which further ribs run essentially transversely thereto. In connection with the transversely running ribs, compressive forces are built up in the annular ribs in the circumferential direction which act in a mode providing rigidity to the structure. By means of the deformation, the annular ribs are drawn outward over their entire length, whereby they extend themselves and thereby build up tension stresses in the circumferential direction which, in a manner like a collar, enclose the highly stressed areas of the bearing and the bearing seat.

The most effective position for the annular rings is the outer area of the part parallel to the bearing plane, since at this location, because of elasticity, the start of the wall area inclination comes into play, as well as the angle-change of the said part parallel to the bearing plane. Both components are additive and effect an expansion of the annular ribs so that, even at small displacements, a stabilizing tension is brought into action in the circumferential direction. Where the optimization of the rigidity of the bearing housing is concerned, considerable importance must be laid on an ability to generate a substantial stabilizing tension, at an early point. Although the bearing housing wall, among other things, assures the housing function of the bearing housing, this being, namely, the protection of the internally situated components and to provide outward support, the ribs not only enhance the optimized properties of the wall but form substantial inherent wall components of the structure, which lend a high degree of rigidity to the bearing plane parallel area in the stressed area.

The annular ribs react to the deformation of the bearing housing with a constant increase of the tension force and act, in this way, to counter the said deformation. The invented bearing housings, for example, can be used especially advantageously in connection with highly stressed axle drives, which transmit high torques at the end of a drive chain and, as a rule, include a beveled gear differential drive.

BRIEF DESCRIPTION OF THE DRAWINGS

The invention will now be described, by way of example, with reference to the accompanying drawings in which.

DETAILED DESCRIPTION OF THE INVENTION

Figure 1:
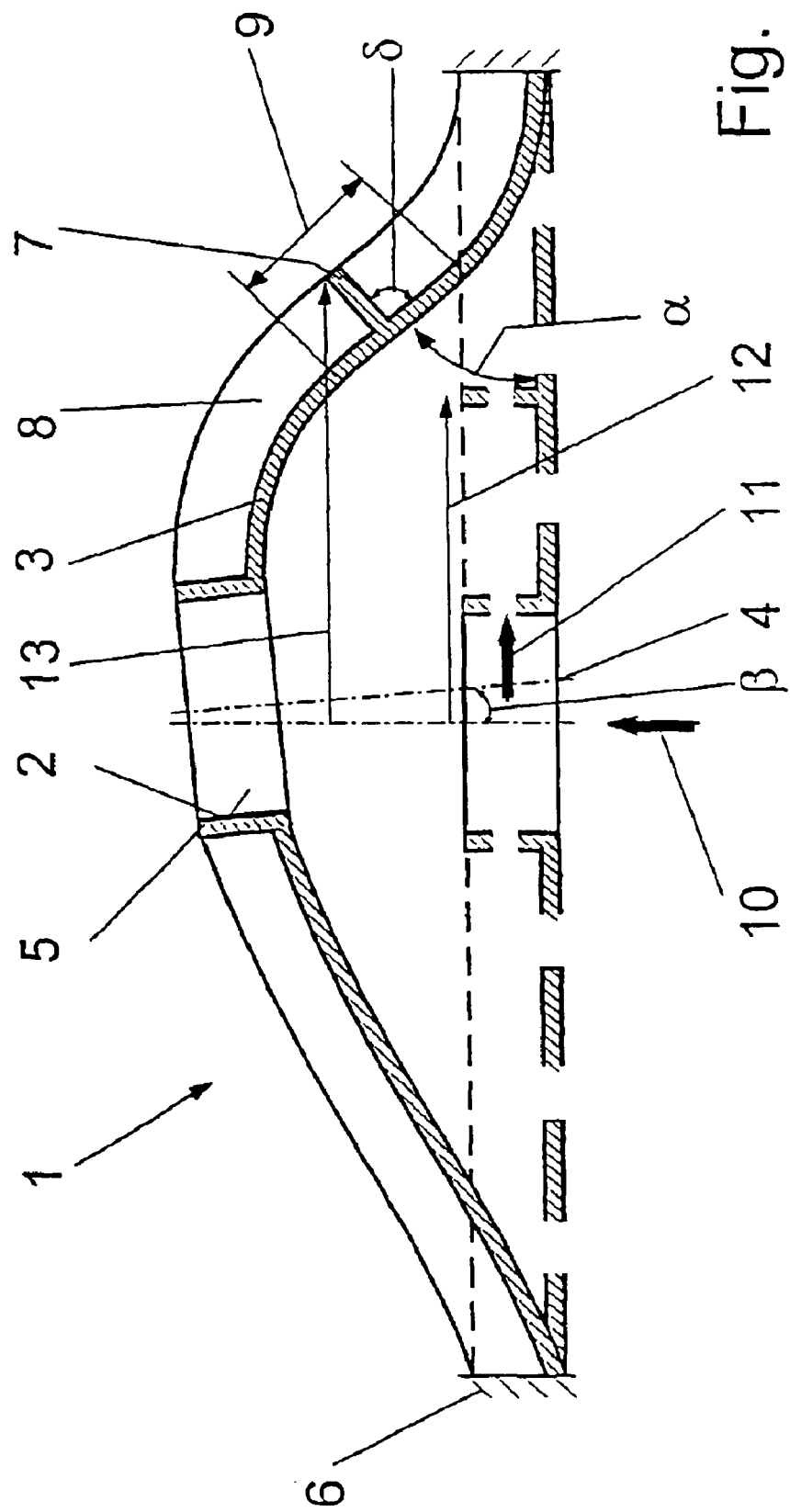
FIG. 1 is a longitudinal cross-section through an invented bearing housing with a flat bearing housing wall.
Figure 2:
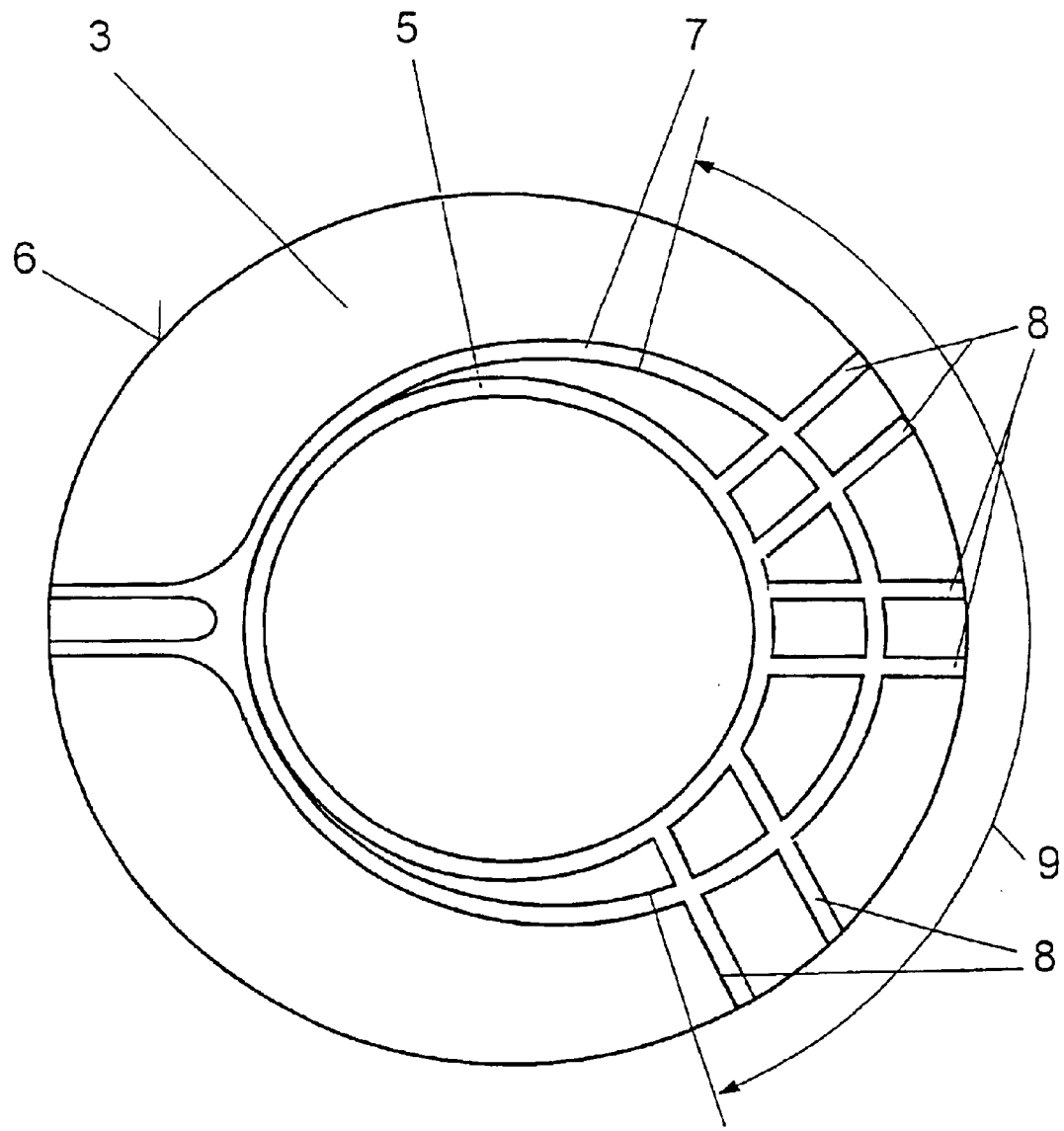
FIG. 2 is a plan view on a bearing housing in accord with FIG. 1.

The bearing housing 1, presented by dotted lines in FIG. 1, is shown as it appears in a load free state. The presentation with the full lines represents deformation of the bearing housing 1—in an exaggerated scale—when subjected to loading by axial forces 10 and resolving into a radial principal load 11. The bearing housing 1 has a bearing housing wall 3, which extends on into the wall of a machine housing, the latter is not shown. The transition surface is indicated by 6. The bearing housing wall 3 which, in its load-free original state, is essentially flat, carries a bearing block 5 concentric to a bearing axis 4, which has a bearing seat 2 for reception of a shaft bearing (not shown), namely, a tapered roller bearing.

When subjected to loading, as indicated by 10, 11, and because of the connection of the bearing housing wall 3 with the wall of the machine housing, the bearing housing wall 3 deforms itself in various ways so that it has areas which, under stress, show a varying angle of inclination a to the original load-free position. At the same time, the bearing seat 2 tilts, whereby the bearing axis 4 moves a corresponding angle β and a piece is displaced in the direction of the principal load 11. In an area 9, in which the angle of inclination a normal changes itself to the greatest degree, an annular rib 7 is placed. By means of the deformation of the bearing housing wall 3, the annular rib 7 is forced from a clearance 12 with the bearing axis 4 to a greater clearance 13. When this occurs, compressive stresses in the circumferential direction of the annular rib 7 are generated. These act contrary to the deformation of the bearing housing wall and lead to a higher degree of shape-retention, especially if the upward curve of the compressive stress is steep, in other words, when the compressive stress gradient is large because of the deformation.

This situation is achieved in the case of the invented arrangement, in that the annular rib 7, due to the large change of the angle of inclination α, tilts strongly outward and produces large tension stresses, especially in the area of its free end. The magnitude of said stresses, besides being dependent upon the change of the angle of inclination α, also dependent upon the height of the annular rib 7. Additional ribs 8 are provided, which run transverse to the annular rib 7, which obstruct an inward deviation of the annular rib 7 so that the annular rib 7, subjected to the influence of the tension stress, does not change its angle δ to the bearing housing wall 3.

The annular rib 7 is, preponderantly, effective in the area, which is most greatly subjected to stress and which area would suffer the greatest deformation. In that area, which lies diametric to the bearing axis 4, which is less stressed and is essentially in tension, the annular rib 7 can well be omitted. In this case, it is principally advantageous that the annular rib 7 possess a closed annular structure, which is intended to bring the said less stressed area into a load sharing condition. To this end, the annular ribs 7 run in this area near to the bearing block 5 or joins therewith, so that the said block assumes a part of the annular rib structure. By means of the shortness of the annular rib 7, the material consumption can be reduced, even as the shape-stability characteristics are increased.

Figure 3:
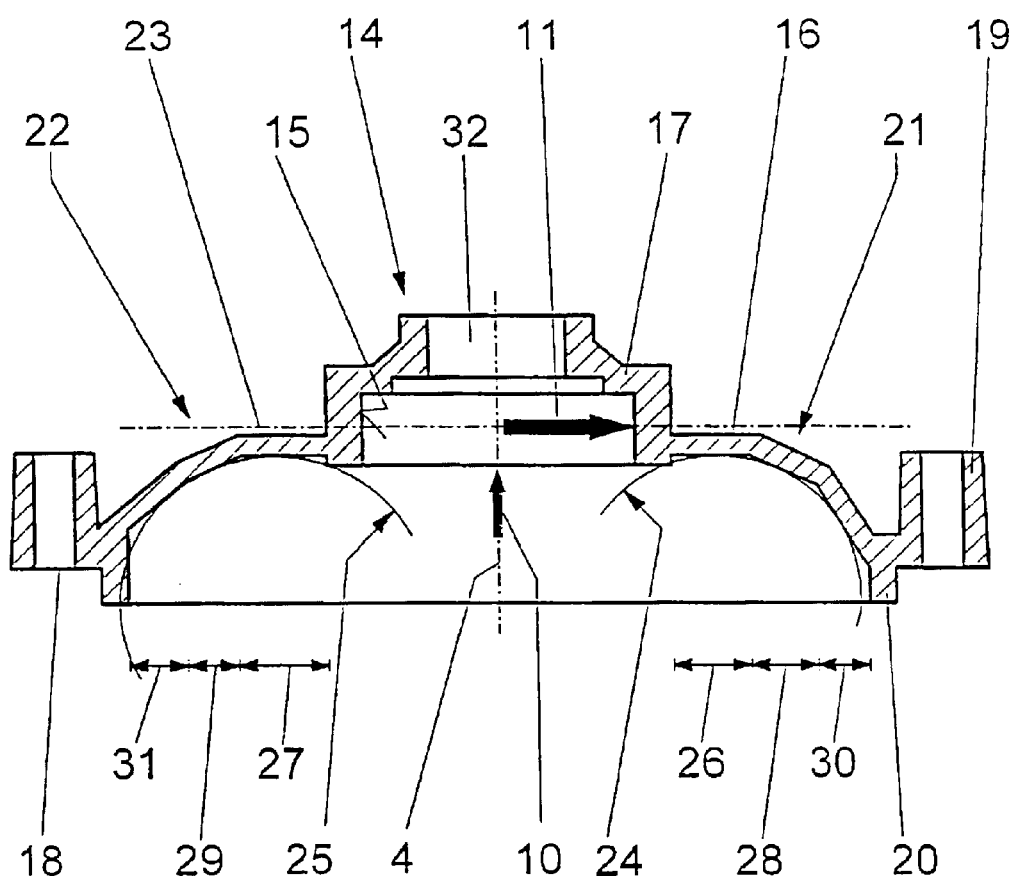
FIG. 3 is a schematic longitudinal cross-section through an invented, shell type designed bearing housing, serving as a bearing cover without ribs.
Figure 6:
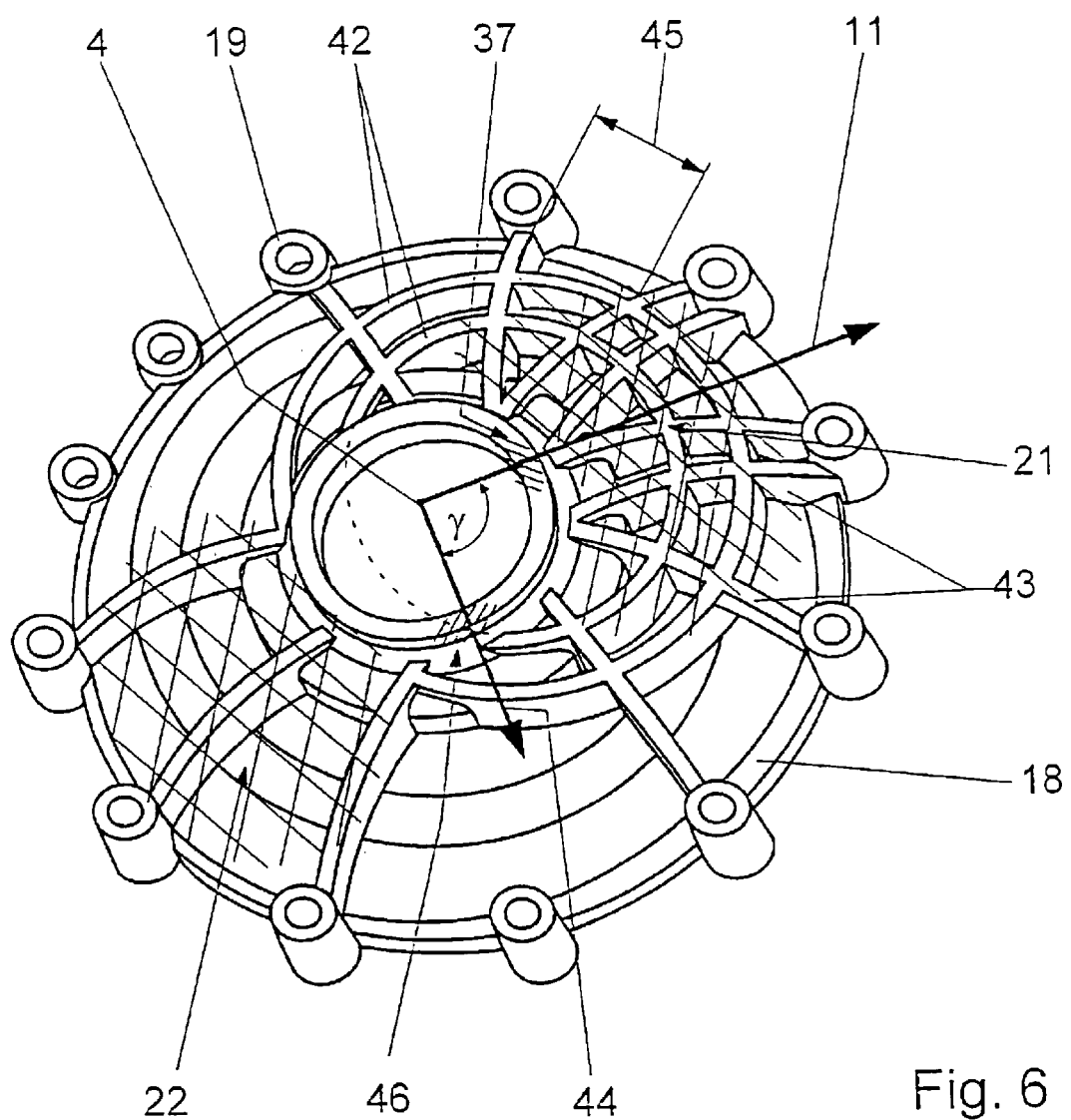
FIG. 6 is a perspective presentation of a bearing housing in accord with FIG. 3 showing ribs.

In FIGS. 3, 6, a bearing housing 14 in the shape of a bearing cover can be seen which, by means of a centering connection 20, is accordingly centered in a machine housing (not shown), for example in the housing of a vehicle transmission with a bevel gear differential drive. The said bearing cover 20 is bolted to a flange 18 by means of bolt eyes 19 so that the bearing cover, with its flange 18, lies on a corresponding receiving surface of the machine housing. Generally, it is also possible that the bearing housing 14, similar to the bearing housing 1, forms an integral part of the machine housing in which the bearing housing wall 16 in the area of the flange 18 has a transition into the machine housing.

The bearing housing 14 possesses a bearing seat 15 for the reception of a bearing, for example a tapered roller bearing, for the placement of a differential cage. A mean bearing plane is designated as 23 in which radial forces form the principal load 11, during power input mode, and form a smaller load 44, during the compression mode (FIG. 6). These said forces act through the outer bearing ring 33 on the bearing seat 15 and on the bearing housing wall 16. The bearing axis carries the reference number 4.

The bearing housing 14, with reference to the bearing axis 4, has a rotational symmetric bearing block 17 which encompasses the bearing seat 15 and a boring 32 therein for a shaft. Basing considerations on the rotation-symmetrical bearing block 17, the bearing housing wall 16 runs in shell shape to the flange 18, whereby the said wall 16, in an area 21 on the side of the principal load 11, exhibits a tighter curve 24 than does the curve in an area 22 which, relative to the bearing axis, lies diametrically opposite to said area 21 and has a less intense curvature 25. The curvatures 24, 25 of the bearing housing wall 16 can be assembled out of a plurality of incremental pieces 26, 28, 30 and 27, 29, 31, whereby the pieces 26, 27 run essentially parallel to the bearing plane 23. However, the incremental piece 30 in the stressed area 21, which abuts the flange 18, forms such a large angle with the bearing plane 23 that, giving consideration to necessary slopes in casting technology, it approaches a right angle. The corresponding piece 31, in the less stressed area 22, shows an angle less inclined to the bearing plane 23 so that the incremental parts 27, 29, 31 bind the flange 18 with the bearing block 17 practically in a straight line. The incremental parts 28, 29, between the incremental parts 26, 30 or 27, 31, form a transition with the contiguous incremental parts 26, 30 and 27, 31.

Figure 4:
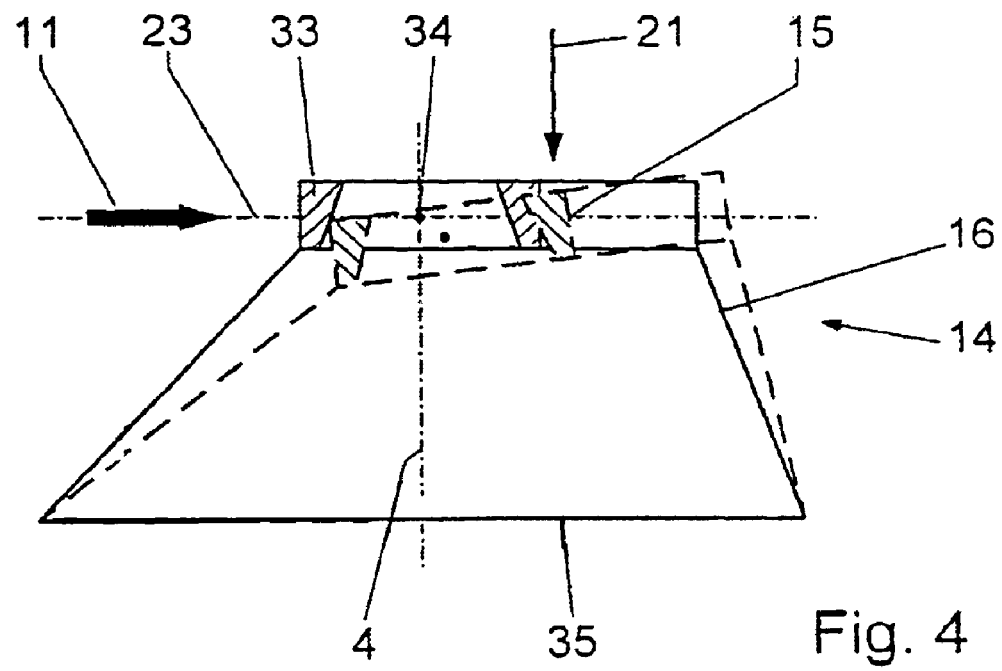
FIG. 4 is a schematic sketch of deformation of a bearing seat of a taper roller bearing in a bearing housing in accord with FIG. 3, being subjected to radial loading.
Figure 5:
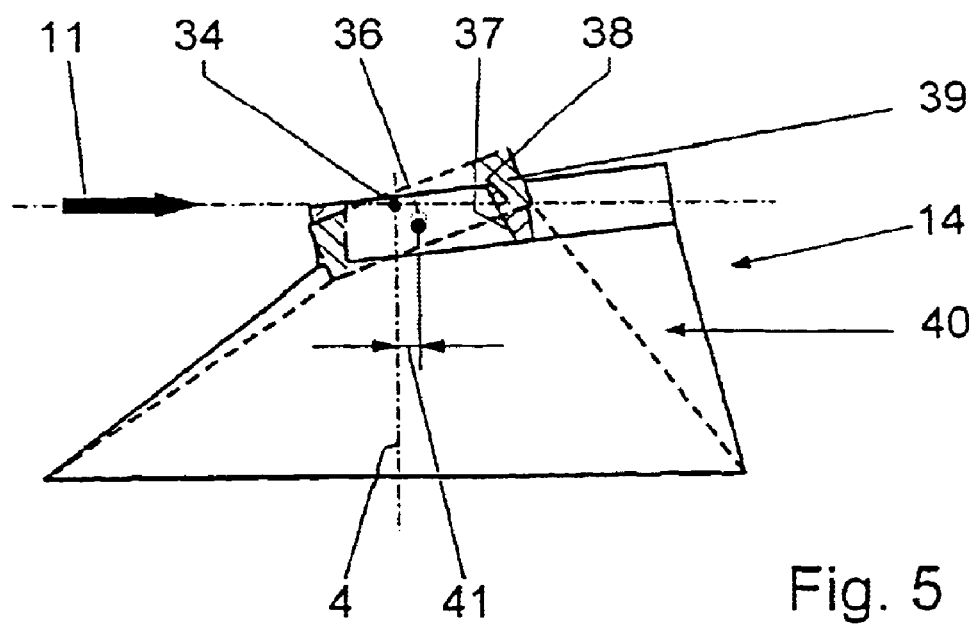
FIG. 5 is a schematic sketch of deformation in accord with FIG. 4, in comparison to deformation of a rotation-symmetrically designed bearing housing.

In the schematic sketches as set forth in FIGS. 4 and 5, the complex, three-dimensional structural problem is simplified by a two-dimensional presentation. Further, the assumption is made that the structural elements are rigid and bound to one another by linkages. These oversimplified, theoretical viewpoints can, however, illustrate without elasticity the principal differences very well. If the outer bearing ring 33 of a tapered roller bearing, which is set into the bearing seat 15 (FIG. 3), is stressed by a principal radial load 11, the bearing housing 14 deforms, and its bearing housing wall 16 yields back toward the direction of the said radial principal load 11. As this occurs, the bearing seat 15 tilts, taking with it the outer bearing ring 33, and the bearing centerpoint 34 positions itself deeper in the bearing housing 14 toward the flange plane 35, wherein the said centerpoint displaces itself through a radial offset 41 in the direction of the said principal load 11 (FIG. 5). In FIG. 4, the new position of the deformed bearing housing wall 16 and of the bearing ring 33 with the accompanying centerpoint 34 is sketched in dotted lines.

In comparison to the deformed bearing housing 14 of the invention, which in FIG. 5 is depicted with full lines, is a deformed rotation-symmetrically designed bearing housing 40 with the bearing housing shown in dotted lines. FIG. 5 makes clear that, in the case of an equal radial offset 41 of the bearing centerpoint 34, 36, the bearing ring 39, in the rotation-symmetrically designed bearing housing 40, is more intensely tilted than in the case of the bearing ring 33 when the bearing housing 14 is in the form as dictated by the invention. The bearing centerpoint 36 positions itself somewhat less toward the interior of the bearing housing 40 than did the centerpoint 34 in the case of the invented bearing housing 14. Most significantly, however, the load area 38 of the bearing ring 39 migrates outward, while the load area 37 of the invented design of the bearing ring 37 positions itself inward and thus the original position of the carried shaft (not shown) is stabilized.

These consideration are based on rigid structure elements, that is, on structure elements which possess a high capability of holding their shape. This is the case where flatter structures are concerned, which are only slightly stressed by tension, if at all, for example, in the area 22 and in the area 21 of the incremental part 30. The shape-stability would be generally, advantageously increased by means of at least one annular rib 42 accompanied by ribs 43 running transversely thereto. The annular rib 42, which is located in an area of the bearing housing wall 16, the angle of inclination α of which would change the most, at least partially encloses the load area 37 on the bearing seat 15, through which the principal load 11 is directed. This said seat is connected, in the load area 22, onto the bearing block 17, so that a closed ring structure is achieved.

The annular rib 42 exhibits an elliptical shape. In this way, incremental parts 45 can be placed between the transverse ribs 43 and run either as curved or straight pieces. Further, it is possible that one or more annular ribs 42 are provided wherein, at least one of the annular ribs 42 can reach up to the outer area of the incremental parts 26 of the bearing housing wall 16 where, in the area 21 of the principal load 11, the said incremental part 26 extends itself essentially parallel to the plane 23 of the bearing. This incremental part 26 as well as the contiguous incremental part 28 and on the incremental part 30 are very much subjected to bending stresses and require, on this account, especially high shape retaining characteristic. The areas 21 and 22 are marked out with crosshatching. These areas are not clearly delineated as to borders, but rather can merge into one another. The ribs 43, where a combination bearing cover and bearing housing 14 is concerned, are advantageously united with the bolt eyes 19 so that the forces can be well introduced into the machine housing.

Below the principal load 11 and the outer and the induced axial forces, in the annular ribs 42, tension stresses in the circumferential direction are generated which, to an extreme measure, act to increase the rigidity of the structure of the bearing housing 14. The annular ribs 42, in this case, are drawn outward throughout their entire length. This means that the annular ribs 42 are stretched and thus, by means of the tensional forces in the said circumferential direction, act to hold together, i.e., put in compression, the entire encompassed area. Even by motions of small displacement, stabilizing tension stresses build in the circumferential direction which work to counter further deformation.

The depicted principal load in FIG. 6 presents radial loading of the bearing cover 14 in the power input mode, although in the compression mode with no power input a smaller radial load 44 is active. This smaller radial load 44 forms with the principal load 11 an angle γ which, as a rule, runs about 90°. The area of the loading at the bearing seat 15 brought about by the smaller load 44 is designated as area 46. In order to be able to withstand loading of the bearing cover 14 in the compression mode, it is advantageous to design the annular ribs 42 and the transversely running ribs 43 so that they react to the inclinational changing of the bearing housing wall 16 also when subjected to the load 44.

The features of the invention are not only of value for the design of a bearing housing 16 in the case of an axle drive, but the said concepts can be employed advantageously in an equivalent manner for the bearing housing 16 with similar loading relationships.

REFERENCE NUMBERS AND CORRESPONDING COMPONENTS

1 Bearing Housing
2 Bearing Seat
3 Bearing Housing wall
4 Bearing axis
5 Bearing block
6 Connection surface
7 Annular rib
8 Transverse rib
9 Area
10 Axial loading
11 Radial loading
12 Original distance
13 Distance after deformation
14 Bearing housing
15 Bearing seat
16 Bearing housing wall
17 Bearing block
18 Flange
19 Bolt eye(s)
20 Centering connection
21 Area of the principal load
22 Diametrically opposite area
23 Plane of bearing (FIG. 3)
24 Intensive curvature (short radius)
25 Less intensive curvature (long radius)
26 Incremental part (FIG. 3)
27 Incremental part (FIG. 3)
28 Incremental part (FIG. 3)
29 Incremental part (FIG. 3)
30 Incremental part (FIG. 3)

31 Incremental part (FIG. 3)
32 Boring
33 Outside bearing ring
34 Bearing centerpoint
35 Flange surface
36 Bearing centerpoint
37 Area of load
38 Area of load
39 Outside bearing ring
40 Bearing housing
41 Offset
42 Annular rib
43 transverse rib
44 Radial load in compression mode
45 Area
46 Area
α Angle of inclination
β Angle of tilt
δ Angle (annular rib)

What is claimed is:

1. A machine housing having a bearing housing (1, 14), a bearing housing wall (3, 16) provided with ribs (7, 8, 42, 43) affixing a bearing seat (2, 15) to a housing wall of the machine housing, and the bearing housing wall (3, 16) is subject to axial and radial directed loads (10, 11) during operation;

wherein the bearing housing wall (3, 16) has at least one ringlike annular rib (7, 42) formed therein which eccentrically encompasses the bearing seat (2, 15), the at least one ringlike annular rib (7, 42) is located in an area (9, 21) which lies, with reference to a bearing rotational axis (4), diametrically opposite to an area which has a greatest change of an angle of inclination (α), whereby at least one of the annular rib (7, 42) and incremental parts (45) proximal to a bearing block (5, 17) which surround the bearing seat (2, 15) lie in an area connected to said bearing block and a plurality of additional ribs (8, 43) extend transversely to the annular ribs (7, 42).

2. The machine housing according to claim 1, wherein at least one of the annular rib (7, 42) and the incremental parts (45) are substantially elliptical in shape.

3. The machine housing according to claim 2, wherein the annular rib (7, 42) comprises a plurality of straight incremental parts (45) which are located between the transversely running ribs (8, 43).

4. The machine housing according to claim 1, wherein the bearing housing wall (16) is constructed of a shell-shape and, during operation, the bearing housing (16) is subjected to a radial directed principal load (11), whereby the bearing housing wall (16), in an absent of the load, has an area (21) with a cross-section of a more intense curvature than the area (22) which, relative to the bearing axis (4), is diametrically opposed thereto.

5. The machine housing according to claim 4, wherein an annular rib (42) extends to an outer border of an incremental part (26) of the bearing housing wall (16) which runs essentially parallel to the bearing plane (23).

6. The machine housing according to claim 1, wherein the bearing housing (14) is a bearing cover bolted to the machine housing and the transversely running ribs (43) structurally join bolt eyes (19) with the bearing housing (14).

7. The machine housing according to claim 6, wherein the bearing housing (14) is a bearing cover of a tapered bearing differential drive.

8. The machine housing according to claim 1, wherein the bearing housing (14) offset to a side of the radial principal load (11), is subjected to a smaller radial load (44), which forms an angle (γ) with the principal load (11), and the annular rib (42) not only encompasses an area in which the angle of inclination (α) changes the most under the principal load (11), but also encompasses an area with the angle of inclination (α) which changes the most, in relation to its original condition, under the smaller load (44).

* * * * *